March 31, 1931.  C. O. GUERNSEY  1,799,096
LOAD REGULATING MEANS
Filed July 29, 1927  2 Sheets-Sheet 2

Inventor
Charles O. Guernsey
By his Attorneys
Howson & Howson

Patented Mar. 31, 1931

1,799,096

UNITED STATES PATENT OFFICE

CHARLES O. GUERNSEY, OF PHILADELPHIA, PENNSYLVANIA

LOAD-REGULATING MEANS

Application filed July 29, 1927. Serial No. 209,266.

This invention relates to means for regulating the load on prime movers.

An object of the invention is to provide means for automatically holding the load on a prime mover within the capacity of the prime mover.

Another object of the invention is to provide means for permitting the operation of prime movers at full capacity at any speed within desired limits and for holding the load and speed constant.

Another object is to produce an efficient, strong and durable apparatus which may be economically constructed and operated.

Other objects and advantages will hereinafter appear.

The view of the drawings are:—

Fig. 3 is a vertical transverse section as seen from the line 3—3 of Fig. 2;

Figure 1:
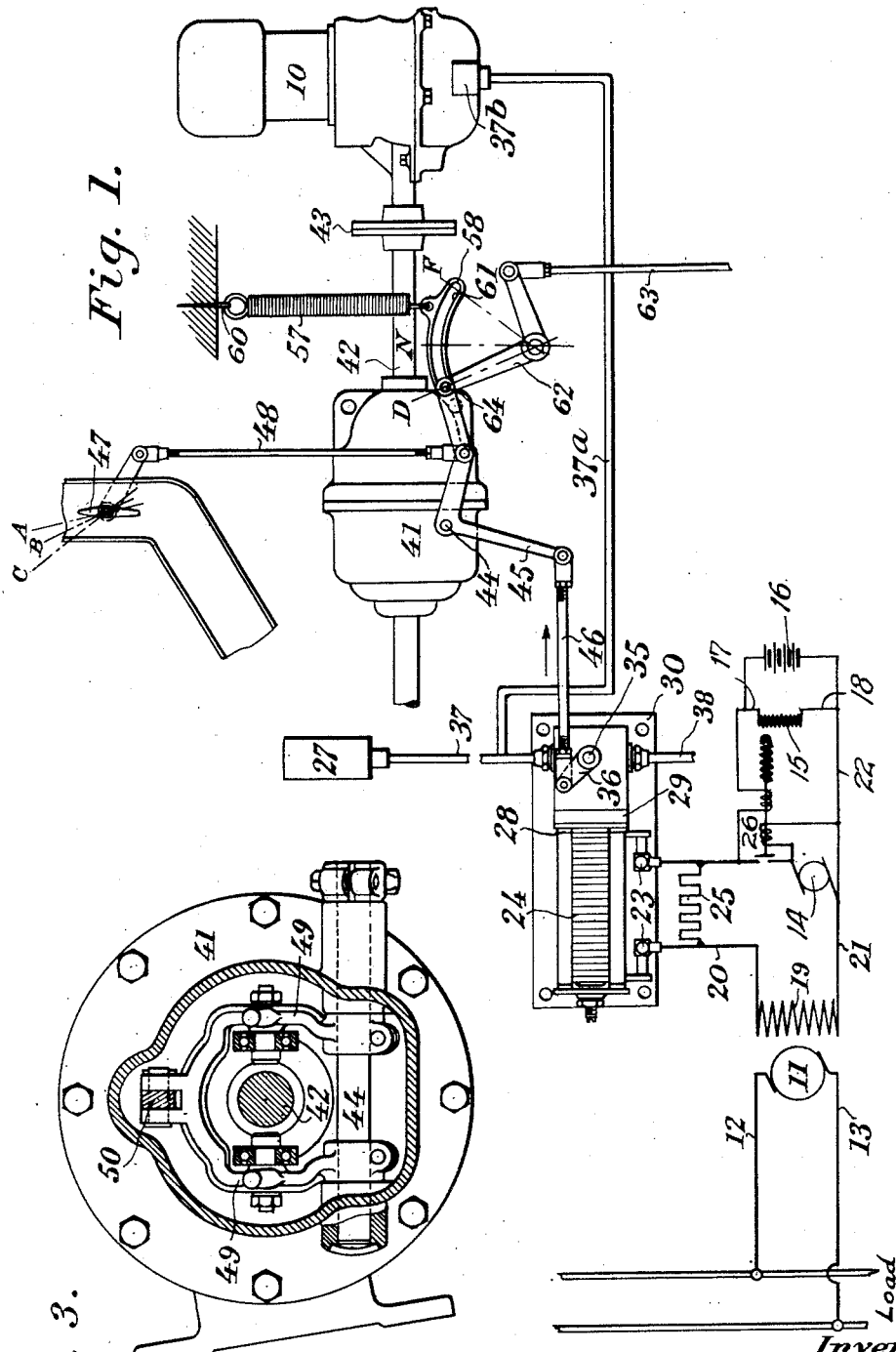
Figure 1 is a diagrammatic view of load regulating means for prime movers constructed according to my invention.
Figure 2:
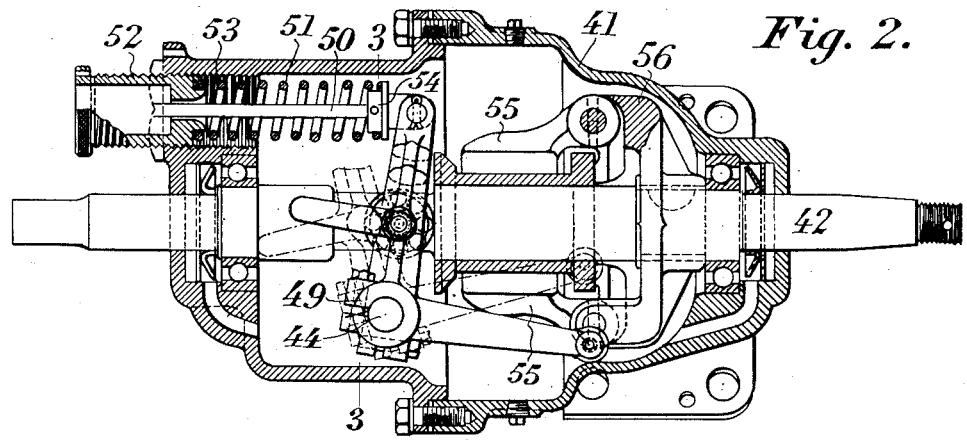
Fig. 2 is a vertical longitudinal section through the governor.

Referring to the drawings, the prime mover, in the present instance, may comprise an internal combustion engine 10. The invention, however, is also applicable to Diesel engines, steam engines, and other types of prime movers.

Connected to the crankshaft of the engine 10 is a main generator 11.

Current from the armature of the generator 11 is carried to traction motors (marked "Load" on the drawing) through conductors 12 and 13.

The current for exciting the field 19 of the generator 11 is secured from an auxiliary generator 14, or from a storage battery 16, depending upon operating conditions, as will appear hereinafter.

The field 15 of the generator 14 is excited by an external source of current, such as the storage battery 16, except when the output of the generator 14 reaches a voltage above that of the battery 16, at which time both the fields 15 and 19 are energized by the generator 14 and the battery 16 recharged.

The field 15 of the generator 14 is connected to the battery 16 by conductors 17 and 18, while the field 19 of the generator 11 is connected to the generator 14 by conductors 20 and 21.

In order to keep the battery 16 from being discharged when the exciter voltage is less than the voltage of the battery, a reverse current relay 26 is connected to the conductor 20, as shown by Fig. 1.

If the output of the generator 14 is below the voltage of the battery 16, then the reverse current relay 26 opens and field 19 and field 15 are both supplied from the battery 16.

The conductors 18 and 21 are connected by a conductor 22.

The conductor 20 is broken, and its two free ends are connected to terminal posts 23 of a variable resistance, which may be in the form of a carbon pile 24.

If so desired, a fixed resistance 25 can be shunted around the carbon pile 24, in the manner clearly shown in Fig. 1. The resistance 25 should be of suitable capacity to carry the excitation required as a minimum.

The circuit above described is such that when the current from the storage battery 16 excites the field 15 of the generator 14, the current will pass through the field 19 of the generator 11.

By this arrangement of parts, if the amount of current passing through the field 19 of the generator 11 is increased, the amount of current generated in the armature of the generator will be increased, and therefore the load on the engine 10 will be correspondingly increased.

Conversely, if the current passing through the field 19 is reduced, the load on the engine 10 will be reduced, and consequently the engine will increase in speed.

Therefore, by varying the resistance through the carbon pile 24 to control the amount of current passing through the field 19 of the generator 11, the load on the engine 10 may be regulated.

For this purpose, the carbon pile 24 is adapted to be operated by fluid pressure from a suitable source of supply, such as a tank 27.

One end of the carbon pile abuts a disk 28 disposed at one end of a cylinder 29.

The cylinder 29 is mounted on a panel 30 which also supports the carbon pile 24.

A piston 31 is slidably mounted in the cylinder 29. The piston has its head formed with a recess 32 which receives one end of an expansible spring 33. The other end of the spring bears against the inner face of the disk 28 and retains the latter in engagement with the end of the carbon pile 24.

The cylinder 29 has a valve 34 which is rotatably mounted therein. This valve has a trunnion 35 projecting therefrom to which is fixed an arm 36.

The valve 34 is connected to the tank 27 by a pipe 37. The pipe 37 may be also connected to the lubricating system of the prime mover by a pipe 37ª when such system is a pressure system actuated by a pump diagrammatically indicated by the reference character 37ᵇ. Then, as will be hereinafter pointed out, the means for releasing the load will be actuated should the fluid pressure in the lubricating system fail.

The fluid pressure is discharged from the valve 34 through a pipe 38.

Figure 4:
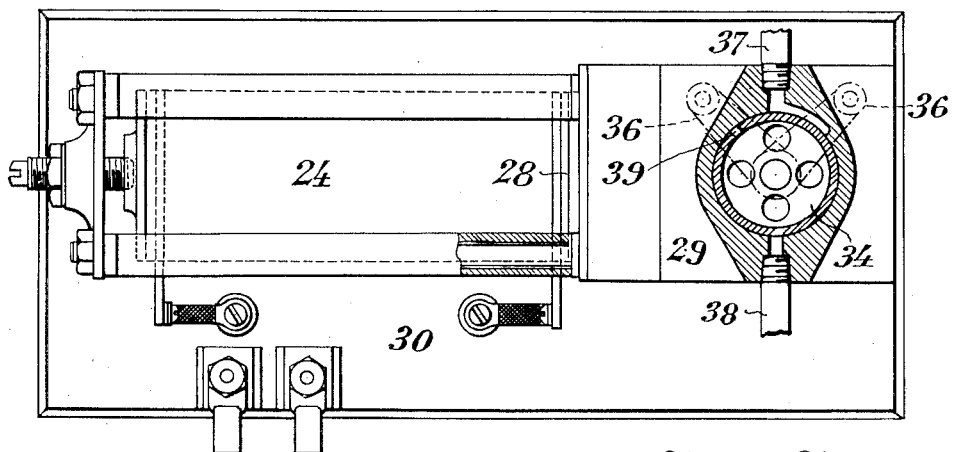
Fig. 4 is an elevation, partly in section, of the control device shown in Fig. 1.
Figure 5:
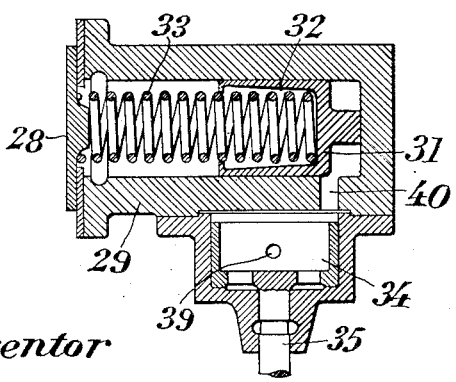
Fig. 5 is a section of the portion of the control device containing the valve and piston.

When the arm 36 is swung from the normal position illustrated in Fig. 1 to the right hand position illustrated by the broken lines, Fig. 4, fluid from the tank 27 will flow through the inlet opening 39 of the valve, and thence through a passageway 40 in the cylinder wall 29. The pressure of the fluid behind the piston 31 will force the piston towards the opposite end of the cylinder. This action will compress the spring 33 which will cause an increase in the pressure exerted by the disk 28 against the end of the carbon pile 24, and in this way the carbon pile will be compressed.

For the purpose of actuating the valve 34, I utilize suitable means, including a governor 41.

The mechanism comprising the governor is disposed within a suitable housing.

The governor has a longitudinal shaft 42 that is directly connected to the shaft of the engine 10 by a coupling 43.

A shaft 44 is disposed transversely of the governor, being positioned beneath the shaft 42.

One end of the shaft 44 has a bell crank lever 45 fixed thereto.

The free end of the arm 36 is connected to the end of one of the arms of the lever 45 by an adjustable rod 46.

The end of the other arm of the lever 45 is connected to the controlling means 47 of the engine 10 by an adjustable rod 48.

In the present instance, the controlling means 47 may be in the form of a throttle valve.

The shaft 44 has fixed thereto a pair of yokes 49 having arms extending upwardly and arms extending forwardly from the shaft 44.

The upwardly extending arms of the yokes 49 are connected to a horizontally disposed rod 50. An expansible spring 51 encircles the rod 50, one end of the spring seating against a cap 52 in a threaded recess 53 formed in the housing of the governor, while the other end of the spring bears against a collar 54 on the end of the rod 50 adjacent its connection to the yokes 49.

By screwing the cap 52 inwardly or outwardly of the recess, the tension of the spring 51 may be varied, as will be readily understood.

The forwardly extending arms of the yokes 49 are connected to pivoted members 55, constituting centrifugal weights. The weights are carried by a collar 56 mounted on the shaft 42.

The action of the weights 55 is such that, as the speed of rotation of the shaft 42 is increased, the rod 46 will be moved in the direction of the arrow, Fig. 1, and the rod 48 will be moved upwardly, thus increasing the load and reducing the throttle opening of the engine 10.

This action is counter-balanced by a spring 57 which has one end fixed to the extremity of a lever 58, and its other end connected to a fixed support 60.

The lever 58 is fulcrumed to the upwardly extending arm of a bell crank lever 62, and it is provided with a slot 61. The lever 58 is also connected to the forwardly extending arm of the bell crank lever 45.

The bell crank lever 62, actuated by a rod 63, is fulcrumed below the lever 58. The lever 62 has its upwardly projecting arm provided with a roller 64 which is mounted in the slot 61.

In the position of the parts illustrated in Fig. 1, the spring 57 and the weights 55 of the governor balance at the maximum speed of the engine 10, and any movement in one direction will simultaneously increase the load on the engine and close the throttle valve 47, and any movement in the other direction will decrease the load and increase the power of the engine.

The construction of the valve 34 is such that the fluid pressure will be admitted or discharged when the throttle valve 47 is between positions A and C (Fig. 1), there being a neutral position B, at which the load is held constant.

By varying the length of the rod 46, the relation between the position of the valve 34 and the throttle valve 47 can be varied, so that, if desired, the load can be varied to hold the engine 10 at substantially wide open throttle.

If the fulcrum of lever 58 is moved from position D, as shown, to position N, by moving rod 63, which is attached to the manual controlling means, the engine and load will balance at some lower engine speed, due to the lesser leverage ratio between the spring 57 and the weights 55. It might be said that the engine would balance at one-half of maximum speed, but still be pulling full load in this position.

If the rod 63 is moved downwardly still further, so that the fulcrum of the lever 58 is at the position F, then the spring 57 and weights 55 combine to close the throttle, and the throttle valve 47 would then close to its minimum position.

The invention set forth herein is, of course, susceptible of various modifications and adaptations.

The invention claimed is:—

1. In combination, a prime mover having a throttle; a variable load on said prime mover, a control means for said load; a speed responsive governor connected to said prime mover; a connection between the governor and the throttle of the prime mover; and a connection between the governor and control means for said load, said connections being adjustably interlocked to provide an equilibrium point of said connections for any predetermined speed of said prime mover to give the desired output for said speed, so that upon variations in said load, the said load may be adjusted to normalcy and the power output of the prime mover may be varied, and means for adjusting the equilibrium point of said interlocked connections for any predetermined speed of said prime mover to give the maximum desired output for said predetermined speed.

2. A load regulating system for a prime mover having a throttle comprising a speed responsive governor connected to the prime mover; a load on the prime mover; control means for said load, a fluid actuated means for operating said control means, adjustable means having an equilibrium adjustment point for any predetermined speed of said prime mover to give the desired output for said speed, said adjustable means being responsive to variations of said governor for initiating the operation of said fluid actuated means, and controlling the throttle on the prime mover, and adjustable means for varying the equilibrium point of said last mentioned means for any predetermined speed of the prime mover to give a maximum power output from said prime mover for said predetermined speed.

3. A load regulating system for a prime mover having a drive shaft for keeping the load substantially constant for any one of a number of different speed-settings, comprising a governor connected to the drive shaft of the prime mover; a load connected to said shaft, means for controlling said load, means actuated by said governor for operating said control means; means actuated by said governor for controlling the power of the prime mover; said last two means being adjustably interlocked to provide an equilibrium point for any predetermined speed of said prime mover to give the desired output for said speed, and means separate from said governor for varying the equilibrium point of the regulating system, to any desired speed, to give a maximum output from said prime mover for said speed.

4. Means for maintaining the load of a prime mover substantially constant, said means comprising a prime mover, a generator driven thereby, a variable resistance in the field of said generator, a governor actuated by said prime mover for controlling said resistance, means counterbalancing said governor, means actuated by said governor for controlling the power of said prime mover, and means comprising an adjustable fulcrum operable at the will of the operator to vary the influence of said counterbalancing means on said governor, whereby the prime mover can be controlled at any of a variety of predetermined normal loads.

5. Means for maintaining the load of a prime mover having a pressure lubrication system substantially constant, said means comprising a prime mover, a generator driven thereby, a variable resistance in the field of said generator, a governor actuated by said prime mover, fluid pressure means actuated by said governor for controlling said resistance, means for utilizing the pressure lubrication system of said prime mover for supplying the necessary fluid pressure, means substantially counterbalancing said governor, means actuated by said governor for controlling the power of said prime mover, and means comprising an adjustable fulcrum operable at the will of the operator to vary the influence of said counterbalancing means on said governor whereby the prime mover can be controlled at any of a variety of predetermined normal loads.

CHARLES O. GUERNSEY.